Jan. 16, 1962
N. N. HOCHGRAF
3,017,442
METHOD FOR IMPROVING CAA ACETYLENE REMOVAL
Filed Sept. 25, 1959
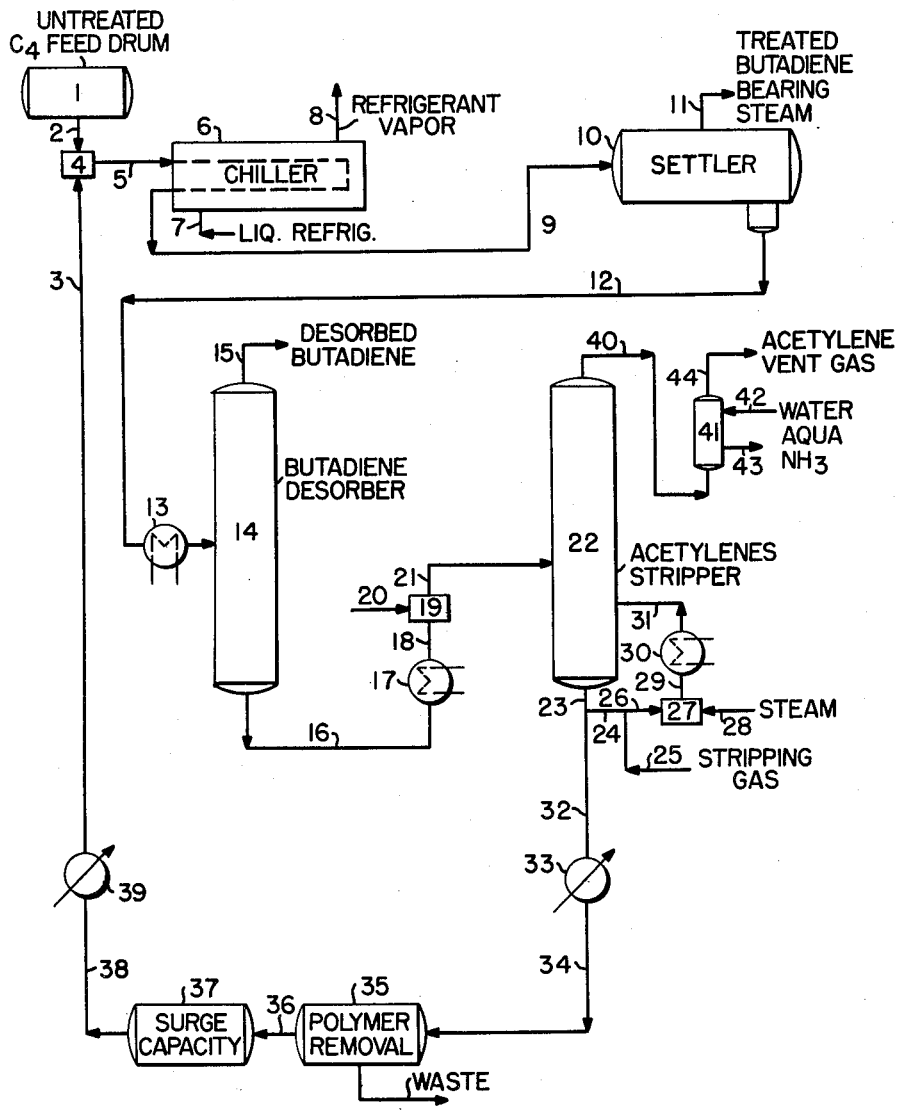
Norman N. Hochgraf    Inventor
By *Peter H. Smolka*
Patent Attorney

United States Patent Office 3,017,442
Patented Jan. 16, 1962

3,017,442
METHOD FOR IMPROVING CAA ACETYLENE REMOVAL
Norman N. Hochgraf, Basking Ridge, N.J., assignor to Esso Research and Engineering Company, a corporation of Delaware
Filed Sept. 25, 1959, Ser. No. 842,302
7 Claims. (Cl. 260—681.5)

This invention relates to an improved prewash process for the removal of acetylenes from a diolefin-bearing stream prior to a main extraction or concentration of the diolefins in a subsequent stage. More particularly, this invention relates to certain improvements in such a prewash system whereby polymerization of unsaturates is inhibited. As a result, plugging problems and expensive frequent replacementt of adsorbents which are often used to remove polymerization products are largely eliminated. The prior art is well aware of processes for prewashing butadiene-bearing streams for elimination of acetylenes therefrom, i.e. see, for example, U.S. 2,847,487. In a typical process, a butadiene-bearing stream, containing substantial amounts of butenes and trace or minor amounts of acetylenes, is contacted with a selective solvent such as aqueous cuprous ammonium acetate (CAA) utilizing high ratios of hydrocarbon treated to solvent. By such a pretreat or prewash substantially all of the acetylenes are absorbed (or extracted) along with only minor amounts of butadiene and other components. The pretreated butadiene-bearing stream, substantially free of acetylenes, is then passed to a main butadiene extraction plant. The extract from the prewash stage containing acetylenes and butadienes in the prior art is first stripped or desorbed of butadiene and then is desorbed of acetylenes by heat soaking to break the CAA-acetylene complex, thus leaving a substantially lean CAA solvent for recycle to the prewash extraction stage. This substantially lean CAA solvent, however, contains minor amounts of both copper acetylides and polymers of acetylene and/or butadiene. The polymers contained in this stream must be removed prior to recycle in order to avoid substantial plugging problems and a buildup of polymer in the system.

It has been normal practice to pass this stream without cooling through a charcoal bed at the elevated temperatures required to strip or desorb acetylenes to effect an adsorption of acetylene and butadiene polymers thus regenerating a lean solvent suitable for reuse. Although elevated temperatures are normally considered undesirable for adsorption, the intention was to achieve complete conversion of residual copper acetylide to polymers and then remove the polymers with the char. It has now been found that the polymerization occurring in the adsorbent bed (usually activated char) as a result of the elevated temperatures is actually highly undesirable. In a plant designed according to prior teachings, the polymerization occurring in the char bed contributes importantly to char usage. Also, it appears that polymers actually formed within the bed are more likely to cause plugging and ultimate solidification of the entire bed requiring an extended shut-down to effect removal and replacement thereof. Each replacement of a char bed is a costly operation not only from the standpoint of the manual labor required but also from the standpoint of the large quantities of charcoal used and CAA solution unavoidably lost in the process.

It is an object of this invention to provide a prewash system of the type generally described above but wherein polymerization is inhibited not only in the acetylene stripping stage but also within the char bed itself and whereby the life of the char bed is substantially extended over the prior art practices.

It has now further been found that, if the acetylide-rich CAA solution after desorption of butadiene is directly contacted with steam, two essential prior art steps may be replaced, i.e. the necessary addition of water to the CAA for the purpose of maintaining the proper solvent concentration and the indirect heating means normally employed in acetylene stripping. The use of direct steam is contrary to normal practice since it tends to produce a continuing weakening of solution concentration because of dilution by the condensate formed. However, it has now been found that the ammonia or other suitable stripping gas at the high temperatures conventionally used in the acetylene stripper desorbs and strips water from the CAA solution so that the overall process can easily be kept in water balance between this removal and the addition from the steam condensate. The temperatures and gas rates normally employed for desorbing and stripping acetylenes are sufficient to accomplish the desired effect. Additionally, the direct injection of steam into the CAA solution prior to the acetylene stripper achieves a substantially instantaneous increase in solution temperature. This is important in that careful consideration and analysis of plant and laboratory data has now shown that the solution residence times at high temperatures during solution heating and butadiene and acetylene desorption are major contributors to butadiene and acetylene polymerization.

Since only as much water (steam) as is needed to keep the overall process in water balance can be conveniently added, the maximum effect is achieved by using direct steam injection to replace indirect heat at points in the process where butadiene and acetylene concentrations in the solution are high and the solution is simultaneously at an elevated temperature. Thus, the most advantageous use of open steam would be to replace the high temperature portion of the solution preheat prior to the acetylene stripper and use the remainder of the steam allowed to supply heat in the bottom of the acetylene stripper. The total allowable steam will be determined by the acetylene stripper temperature, pressure and amount of stripping gas ($NH_3$ or other) used. This will vary somewhat from plant to plant.

After the rapid stripping operation, the stripped CAA solvent is immediately quenched (indirect heat exchange is satisfactory) to a relatively low temperature (also to reduce residence times at high temperatures) and is fed directly into a bed of activated charcoal to effect the adsorption of polymer and to permit recovery of reusable lean CAA solvent. To avoid rapid deactivation of the charcoal or plugging of the bed as previously discussed temperatures in this char treat step are maintained no greater than 170° F., preferably less than 125° F. Contact time between the polymer-containing CAA solution and the activated charcoal is usually in the order of 15–60 minutes and the lean CAA solvent recovered from the charcoal bed which may contain small amounts of copper acetylides is suitable for recycle to the prewash extraction stage. The slight loss in acetylene extraction efficiency is more than made up for by the benefits of reducing polymerization to a minimum.

Prior art processes removed the hot, lean CAA solution from the bottom of the acetylene stripper and allowed it to soak at high temperature to allow complete polymerization of the residual acetylenes. Essentially all of the acetylenes were polymerized but a significant fraction did not reach a polymeric state suitable for removal by known processes. These oily, surfactant polymers then contributed heavily to solution foaming and emulsion difficulties. Thus, in addition to recognizing the special techniques required to prevent polymerization in the desorption and stripping steps, it has now been found that it is highly advantageous to quench the lean, hot solution immediately after it leaves the stripper in order to prevent (rather than promote, as was previously done) the further polymerization of residual acetylenes. These residual acetylenes present in the solution in the form of soluble copper acetylides are recycled to the acetylene extraction, butadiene desorption and acetylene stripping steps where they are continually removed from the solution by being taken overhead as vapors in the acetylene stripping tower.

The present invention will be more clearly understood from a consideration of a schematic flow plan of the prewash system of the present invention. An acetylene-contaminated butadiene-bearing stream from drum 1 is passed by line 2 to be mixed with a stream of lean cuprous ammonium acetate solution from line 3 in mixer 4 and the resulting mixture is passed by line 5 through a chiller 6. A suitable refrigerant, such as liquid ammonia is supplied by line 7 to the chiller. The refrigerant, e.g. ammonia vapor, following heat exchange is removed by line 8 from chiller 6.

The butadiene-bearing stream containing for example 5000–500 p.p.m. acetylenes should be preferably mixed with a minor proportion of the lean aqueous cuprous ammonium acetate solvent, e.g. in the range of 1 to 10 parts by weight hydrocarbon to 1 part solvent depending on the acetylene content of the butadiene-bearing stream, i.e. higher acetylene contents requiring lower hydrocarbon to solvent ratios. The mixture is chilled in the chiller 6 preferably to about 40° F. or in the range of 20° to 50° F., and at such a temperature is transferred by line 9 to the settler drum 10, wherein the hydrocarbon phase is separated from the aqueous cuprous ammonium acetate containing absorbed acetylenes, a small amount of absorbed butadiene and traces of copper acetylides and polymers. Residence time for the settling of the mixture of the hydrocarbon stream and the aqueous cuprous ammonium acetate solution may be 5 to 60 minutes depending largely on solution surfactant content and temperature. The liquid hydrocarbon, substantially free of acetylenes, is decanted or drawn overhead from the settler 10 through line 11 for processing in a butadiene extraction plant.

The aqueous solution of cuprous ammonium acetate containing the absorbed acetylenes with a small amount of absorbed butadiene is withdrawn from the bottom of the settler 10 through line 12 and is passed to preheater 13. The heated stream is then passed to the butadiene desorber 14 which alternatively may be an empty drum or packed column or other such device. Gaseous desorbed butadiene is withdrawn overhead through line 15. By controlling the variables of pressure and temperature in the desorber 14, a maximum desorption and recovery of butadiene (substantially free of acetylenes so that it may be economically recovered) is accomplished. The butadiene taken overhead from desorber 14 preferably has sufficient purity to be blended with the product butadiene recovered in the butadiene extraction plant. If not, the stream from line 15 can be recycled back either to drum 1 or mixed with the material from line 11. The desorber preheater and the desorber itself should both be designed for minimum liquid and vapor holdup to lessen the opportunity for thermal and catalytic polymerization of acetylenes and butadienes. Low pressures in vessel 14 of the order of about 15 p.s.i.g. (range 0 to 50 p.s.i.g.) permits rejection of the butadiene at moderate temperatures. Temperatures in vessel 14 of the order of 120°–160° F., e.g. 140° F. are preferred although temperatures of 110°–180° F. may be used.

The acetylene-containing CAA solution withdrawn from vessel 14 is passed through line 16 to preheater 17 where it is preheated, if necessary, and is then introduced through line 18 into mixer 19 wherein open steam is supplied through line 20. Alternatively, the steam may be introduced ahead of said mixer or, even, in some cases, directly into line 18.

The use of open steam to accomplish all, or any portion of, the required heating of the CAA solution has three basic purposes:

(1) To accomplish high level (150–220° F.) heating of the solution instantaneously so as to minimize hot liquid residence time and therefore polymerization of acetylenes and residual butadiene.

(2) To reduce size of preheat exchanger 17 and so reduce the cost of this piece of equipment.

(3) To add water (steam) to the CAA stream to make up for water lost overhead in the butadiene desorber and stripper vessels 14 and 22. It is particularly advantageous to add the necessary makeup water prior to and during the acetylene stripping operation since dilution of the CAA solution greatly promotes the rapid and complete removal of acetylenes from the solution in vessel 22.

With these considerations in mind it will normally be found most advantageous to add only sufficient open steam through line 20 to accomplish heating of the liquid stream from a temperature of 150–180° F. for stream 18 to the desired temperature for stream 21. Temperatures below 150–180° F. can conveniently be obtained by indirect heat with relatively negligible amounts of polymerization. In addition, the remaining steam required to achieve water balance is more advantageously added to vessel 22 in accord with the reasons just outlined above. The combined, heated stream is passed through line 21 to an acetylene stripper 22 which again alternatively may be an empty drum or packed column or other such device. Vessel 22 may be operated at about atmospheric pressure (range 0 to 30 p.s.i.g.) to cause the acetylenes to vaporize from the solution, and temperatures of 180–220° F., preferably 200° F. Of course, an additional acetylene stripping stage may be utilized. For example, in some operations it is advantageous to provide two stages, the first operating at temperatures of above 150° F. to 200° F. and the second at temperatures of about 175° F. to 225° F.

Decomposition of the copper acetylides and removal of the dissolved acetylene from the solution in vessel 22 is assisted by the action of heat and stripping gases such as ammonia, natural gas, etc. CAA is withdrawn from vessel 22 via line 23 and led through line 24 to the point where stripping gas is added through line 25. The gas-liquid mixture is passed through line 26 to the mixing device 27 where open steam is introduced through line 28. Alternatively, the steam may be added ahead of mixer 27 or, even, in some cases, directly into line 26. Where heater 30 is not required, stripping gas and steam may be introduced directly into vessel 22. The use of ammonia as a stripping gas and steam as a heating medium are much preferred. These materials replace the ammonia and water which are unavoidably liberated in the stripping operation and carried overhead in vessel 22 and out of the system. The amount of ammonia added through line 25 will vary, depending on the degree of acetylene stripping required. However, an ammonia addition rate of 2 g.-mols $NH_3$/liter of solution entering through line 21 has been found useful. Sufficient steam is added to keep the prewash system in "water balance." In other words, the total water added as open steam through lines 20 and 28 should be equal to the total water lost from the system.

The gas-liquid mixture from mixer 27 is led through line 29 into heater 30 and thence returned through line 31 to vessel 22.

The exact means of introducing stripping gas and steam and the order in which such additions and heating are performed is not considered essential to the invention. However, the arrangement described above is felt to be preferred. It is easily seen that the process can be controlled to provide water balance by the proper variance of stripping gas rates and/or control of additional heat supplied in the heaters 17 and 30. It should be noted that, in addition to the benefit of reducing polymer formation obtained by reduced holding times, savings in indirect heat exchange equipment and in problems connected with the fouling by polymer of said heat exchange equipment are obtained.

The stripped CAA solution is withdrawn from the stripper circuit through line 32 and is preferably passed immediately through cooler 33 where its temperature is reduced to below 170° F., preferably below 125° F., e.g. about 100° F. In general, the cooler the temperature the better, however, the actual maximum temperature which may be used depends on the quantity of residual acetylenes in the lean CAA solution and in the further processing to be conducted on said solution before recycle to the process. The cooled solution is passed via line 34 to a treater 35 where polymers are removed. Of course, the lean CAA solution may be passed directly to treater 35 without cooling but increased polymer formation is thus obtained so that this is less preferred. Treater 35 may alternatively be loaded with activated charcoal, clay-type or other suitable adsorbents. In the case of char, adsorbed and entrapped polymer is removed conventionally by merely passing the fouled char to waste. From treater 35 the lean cuprous ammonium acetate solution is passed through line 36 to surge drum 37 and thence through line 38 and cooler 39 (if further cooling is needed) back through line 3 to the pretreat process.

The acetylenes liberated in vessel 22 are passed overhead through line 40 to water scrubber 41. This water scrubber is provided with water inlet 42 and a drain 43. The purpose of the water scrubber is to recover ammonia from the acetylene-bearing gases entering through line 40. The aqueous ammonia solution obtained is conventionally led to a unit where the ammonia may be concentrated and returned to the process. Scrubber 41 is run at temperatures limited so as to be: (1) hot enough not to pick up too much of the acetylenes and (2) cool enough to pick up ammonia and avoid the formation of acetylene polymers which would foul the equipment and make recovery of the ammonia difficult. Temperatures in the water scrubber 41 may be about 120–150° F. (range 75 to 175° F.). The residue of the acetylene-bearing gas is vented through line 44 and is rejected from the system.

The described prewash system is adapted for use with the various well-known cuprous salt solvents. In general, these solvents are made up of a cuprous salt, a fatty acid radical, and an alkaline radical such as ammonium or an organic nitrogen base.

Analysis of a typical such solvent:

| Component— | Range (as moles/liter) |
|---|---|
| Cupric copper | 0.2–0.4 |
| Cuprous copper | 1.5–3.5 |
| Ammonia | 8.0–12.0 |
| Acetate (as acetic acid) | 4.0–7.0 |
| Water (average) | 20–40 |

The composition of the cuprous salt solutions may be varied in many ways well known.

Typical data showing the effectiveness of acetylenes removal obtained with the prewash system as described above are set forth in the following table:

| | |
|---|---|
| Acetylenes in untreated feed, p.p.m. | 2000 |
| Acetylenes in treated feed, p.p.m. | 400 |
| Wt. ratio of hydrocarbon to solution | 2/1 |
| Treating temperature, ° F. | 40 |
| Settling time per phase, minutes | 20 |

A comparison of the prior art method and the proposed methods is shown in the following table for an industrial plant having a butadiene throughput of 100 T/CD operated under the above described rather severe acetylene removal conditions because of the large quantity of the easily polymerizable monovinyl-acetylene in the feed. These relative char lives are calculated from the large amount of laboratory and commercial plant data available on the CAA pretreat process.

| | Relative char life |
|---|---|
| Prior art method | 1.0 |
| Lean solution quench employed | 3.3 |
| Lean solution quench and addition of open steam to acetylide stripper and its feed | 5.3 |

Thus, used either singly or in combination it is seen that highly significant improvements are achieved.

There are several distinctive features of the prewash system described, notably (1) the use of open steam at carefully designated points in the process for heating and stripping greatly reduces the high temperature soaking time and thus, acetylenes polymerization in the preheating step prior to the stripping of the acetylenes, and in said flash stripping itself (careful employment of conventional heating techniques at other points in the process is satisfactory); (2) the use of proper amounts of open steam allows continuous control of solution composition. The addition of open steam tends to counteract the effects of water normally lost in the overhead gases leaving the butadiene desorber and acetylene stripper. Thus, by proper control of steam and ammonia addition rates in the stripper, the following can be easily controlled: (a) water content of the circulating solution, (b) ammonia content of the solution, (c) degree of acetylenes stripping, and (d) amount of undesirable polymeric by-products formed; and (3) the use of a cooler on the lean cuprous ammonium acetate solution exiting from the acetylene stripper vessel can reduce the residence time of the solution at temperatures where acetylenes polymerization occurs to about 2 to 3 minutes or even less as compared to the conventional time of about 15 minutes to 2 hours.

The foregoing description contains a limited number of embodiments of the present invention. It will be understood that this invention is not limited thereto since numerous variations are possible without departing from the scope of the following claims.

What is claimed is:

1. In a cuprous ammonium acetate pretreat process for the removal of acetylenes from butadiene-rich $C_4$ streams wherein acetylenes are stripped from the fat CAA solution at elevated temperatures with a stripping gas and wherein the lean solution is passed over an adsorbent to remove polymers before recycle to the process, the improvements which comprise injecting in addition to said stripping gas open steam into the fat CAA solution in an amount sufficient to replace water removed with the stripping gas and to supply at least a substantial part of the heat necessary to heat the solution to a temperature in the range of 180° F. to 220° F., and quenching the stripped lean solution to a temperature below 170° F. before passing it over the adsorbent.

2. The process of claim 1 in which the open steam is injected prior to the stripping of the major part of the acetylenes from the CAA solution.

3. The process of claim 1 wherein steam is injected both prior to the stripping of the major part of the acetylenes from the CAA solution and in said stripping of the major part of the acetylenes from the CAA solution.

4. The process of claim 1 wherein the adsorbent is any of the various type of chars.

5. The process of claim 1 wherein prior to the stripping of the acetylenes from the fat solution, butadiene is first selectively stripped from the fat solution.

6. The process of claim 1 wherein ammonia is utilized as a stripping gas in the stripping of the acetylenes from the fat CAA solution.

7. In a cuprous ammonium acetate pretreat process for the removal of acetylenes from butadiene-rich $C_4$ streams wherein acetylenes are stripped from the fat CAA solution at elevated temperatures with a stripping gas and wherein the lean solution is passed over an adsorbent to remove polymers before recycle to the process, the improvements which comprise injecting open steam into the fat CAA solution in addition to said stripping gas and in an amount sufficient to replace the amount of water lost from the CAA solution in the stripping operation thereby also supplying a substantial part of the heat necessary to heat said solution to a stripping temperature of between about 180° F. and 200° F., and quenching the stripped lean solution to a temperature below 125° F. before passing it over the adsorbent, whereby the CAA solution is maintained at the stripping temperature for a maximum time of about 3 minutes to avoid excessive polymer formation and thereby increase the useful life of the absorbent.

References Cited in the file of this patent

UNITED STATES PATENTS

| | | |
|---|---|---|
| 2,434,839 | Davis et al. | Jan. 20, 1948 |
| 2,788,378 | Cotton et al. | Apr. 9, 1957 |
| 2,870,232 | Wilson et al. | Jan. 20, 1959 |